ary Examiner—Nicholas P. Godici
United States Patent [19]
van't Veld

[11] 4,446,646
[45] May 8, 1984

[54] RETRACTABLE LANDING NET

[76] Inventor: Cecil W. van't Veld, 2301 Musgrove Rd., Silver Spring, Md. 20904

[21] Appl. No.: 289,989

[22] Filed: Aug. 4, 1981

[51] Int. Cl.³ .................................................. A01K 77/00
[52] U.S. Cl. ........................................................... 43/12
[58] Field of Search ............................ 43/11, 12, 134; 210/470, 471

[56] References Cited

U.S. PATENT DOCUMENTS

| | | | |
|---|---|---|---|
| 440,568 | 11/1890 | Hebard | 43/12 |
| 549,367 | 11/1895 | Keeman | 43/12 |
| 1,742,550 | 1/1930 | Mann | 43/12 |
| 2,124,952 | 7/1938 | Norris et al. | 43/12 |
| 2,357,438 | 9/1944 | Tomlinson | 210/471 |
| 2,619,755 | 12/1952 | Henson | 43/12 |
| 2,653,404 | 9/1953 | Phaneuf | 43/12 |
| 2,683,949 | 7/1954 | Berezansky | 43/12 |
| 2,738,608 | 3/1956 | Buzzini | 43/12 |
| 3,167,878 | 2/1965 | Daffron | 43/12 |

Primary Examiner—Nicholas P. Godici
Assistant Examiner—Jerold L. Johnson
Attorney, Agent, or Firm—Browdy & Neimark

[57] ABSTRACT

The invention relates to a telescopable retractable landing net for fish. The net is attached to the retractable hoop by resilient hooks. The hooks are spaced around the inner periphery of the hoop and do not extend above the upper surface of the hoop nor below the bottom surface of the hoop, the outer periphery of the hoop is substantially smooth, therefore, the hoop is free of rough surfaces that would restrict the ability of the hoop to be retracted into its hollow handle.

14 Claims, 11 Drawing Figures

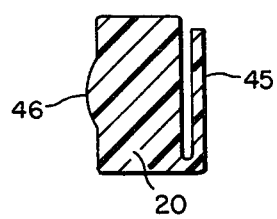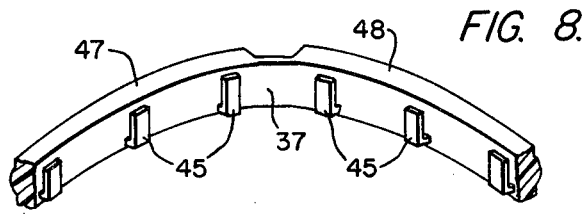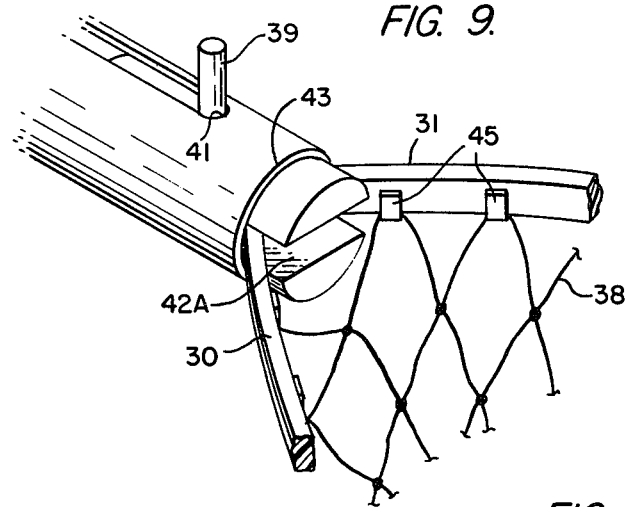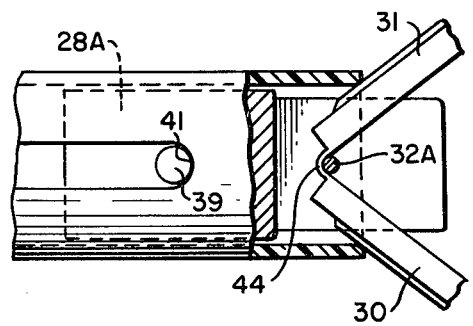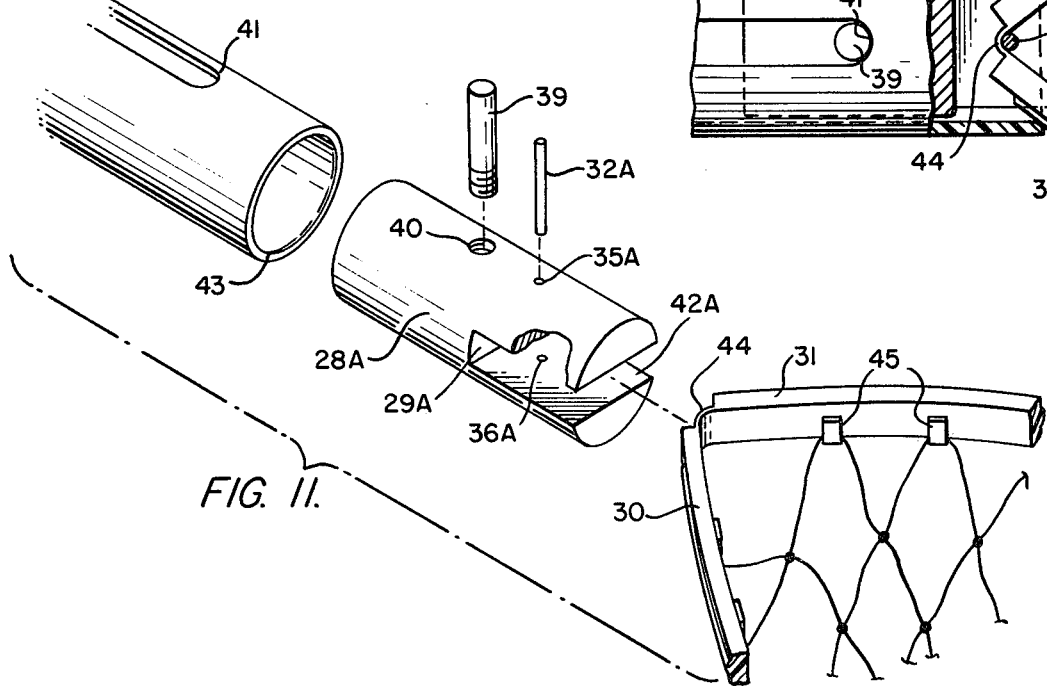

RETRACTABLE LANDING NET

FIELD OF INVENTION

This invention relates to fishing nets and, more particularly, to a retractable net for landing hooked fish.

BACKGROUND OF THE INVENTION

Landing nets suited for one-hand ejection manipulation to effect landing of hooked fish have long been available to and to utilized by anglers. Typical of such are those described in Phaneuf U.S. Pat. No. 2,653,404, Berezansky U.S. Pat. No. 2,683,949, and Daffron U.S. Pat. No. 3,167,878. However, these devices are subjected to repeated operational failure due to malfunction of the internal metal spring and locking mechanism. In addition they are complex and expensive to make. They are difficult to use requiring compressing the internal metal spring to its locking position as the landing net is retracted into the hollow handle after use.

Another disadvantage attending the prior art, as described in Hebard U.S. Pat. No. 440,568, Buzzini U.S. Pat. No. 2,738,608, and Daffron U.S. Pat. No. 3,167,878, is the requirement, firstly, to manually compress the net supporting frame member; secondly, to wrap the net around the compressed net supporting frame member, and, thirdly, to retract manually both compressed net supporting frame member and wrapped-around net into the hollow handle after use.

Another disadvantage of the prior art, as described in Phaneuf U.S. Pat. No. 2,653,404, is the requirement, firstly, to manually unlatch the exterior net supporting frame spring connection, allowing the net supporting frame to return to its pre-formed straightened-out initially set position, and, secondly, to retract manually both net supporting frame member and net into the hollow handle after use.

Another disadvantage of the prior art, as described in Hebard U.S. Pat. No. 440,568; Phaneuf U.S. Pat. No. 2,653,404; Berezansky U.S. Pat. No. 2,683,949; Buzzini U.S. Pat. No. 2,738,608, and Daffron U.S. Pat. No. 3,167,878, is the continuous wear produced on the net material wrapped around the net supporting frame member, as well as the corresponding drag produced thereby on the front end of the hollow handle when the landing net is either retracted or ejected.

Another disadvantage of the prior art is the requirement that the structure of the net supporting frame unit consists of more than one part; e.g. Phaneuf U.S. Pat. No. 2,653,404 and Daffron U.S. Pat. No. 3,167,878 require four parts in the construction of the net supporting frame unit, while Hebard U.S. Pat. No. 440,568, Berezansky U.S. Pat. No. 2,683,949, and Buzzini U.S. Pat. No. 3,167,878 require eight parts.

SUMMARY OF THE INVENTION

Therefore, an object of the present invention is to provide an improved retractable landing net that overcomes the above-mentioned and other disadvantages of prior art.

Another object is to provide a retractable landing net which embodies very few parts and which is simple to construct and assemble.

A further object is to provide a retractable landing net which may be easily ejected as a unit solely by the means of a manually operated handle.

Yet another object is to provide a retractable landing net which may be easily retracted as a unit solely by the means of a manually operated handle without any previous handling of the ejected net supporting frame member and net and without the requirement to compress an internal metal spring to its locking position inside the tubular handle.

Another object is to provide a retractable landing net of the above character which overcomes wear and drag of the net material during ejection and retraction of the landing net by attaching the net solely on the inner face of the net supporting frame member.

Another object is to provide a retractable landing net of the above character which further reduces the drag during ejection and retraction of the landing net by forming the outer face of the net supporting frame member with a smooth and uninterrupted surface.

Another object is to provide a retractable landing net of the above character whereby the net supporting frame member consists of one unit without requiring the attachment of any additional hinge members.

Yet a further object of the invention is to employ the resiliency of the net supporting frame member as the sole means to open the net supporting frame member to its fullest and natural position as it is ejected from the tubular handle and thereafter to maintain the net in fully open position.

Still another object of the invention is to facilitate the handling and transportation of an effective recreational fishing net which otherwise would be prone to snag and catch in the natural obstacles associated with many waters and which thereby improves the ease of participating in the recreational pastime of fishing.

Still a further object of the invention is to provide a landing net which is light in weight and well balanced when open for use and which has ventilation means in the tubular handle for permitting the net to dry after use and when said net is in retracted position within said handle.

Other objects and advantages of the invention will become apparent from the following detailed description of specific embodiments taken in connection with the accompanying drawings of such embodiments; and it will be apparent that many changes may be made in the details of construction and arrangement of parts shown and described without departing from the spirit of the invention. As the preferred form only has been given by way of illustration, there is no intention of being limited to the exact details of construction and arrangement of parts shown and described.

BRIEF DESCRIPTION OF DRAWING

Referring to the drawings:

FIG. 7 is a sectional view of the resilient net supporting frame member taken on line 7—7 of FIG. 6, showing the outer face surface of the resilient net supporting frame member as being smooth and rounded and uninterrupted and the inner face surface of said resilient net supporting frame member containing a hook used for the attachment of the net;

FIG. 8 is a fragmentary perspective plan view of an embodiment of a resilient net supporting frame member showing an integral hinge connection of the exterior ends of the resilient net supporting frame member;

FIG. 9 is a perspective view, similar to FIG. 3, of a second embodiment showing resilient net supporting member in fully ejected position and resting against the smooth front edge of the tubular handle and supported by the protruding notches of the slide block;

FIG. 10 is a fragmentary sectional plan view of a device according to the invention showing an integral hinge as a modified form of the interior hinge connection;

FIG. 11 is an exploded view of the modified forms of the front end of the tubular handle, the slide block and the interior ends of the resilient net supporting frame member.

DETAILED DESCRIPTION OF THE PREFERRED EMBODIMENTS

Figure 1:
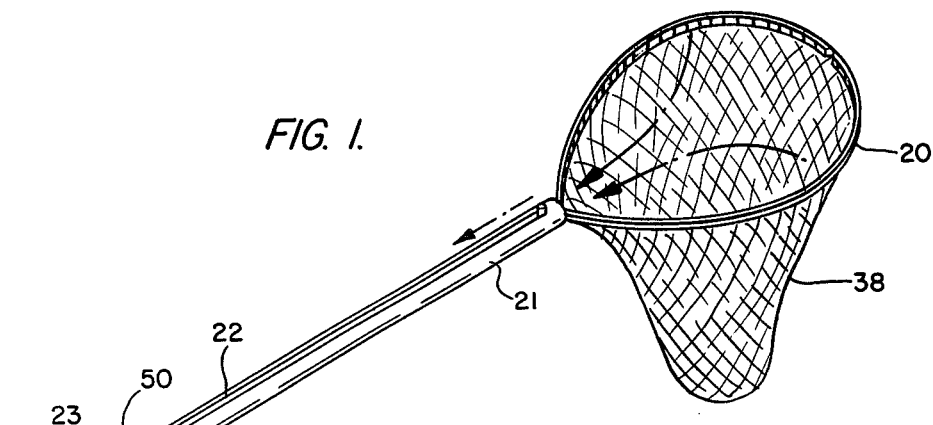
FIG. 1 is a top perspective view of a device embodying the invention showing a resilient net supporting frame member and net in ejected position externally of the tubular handle.
Figure 2:
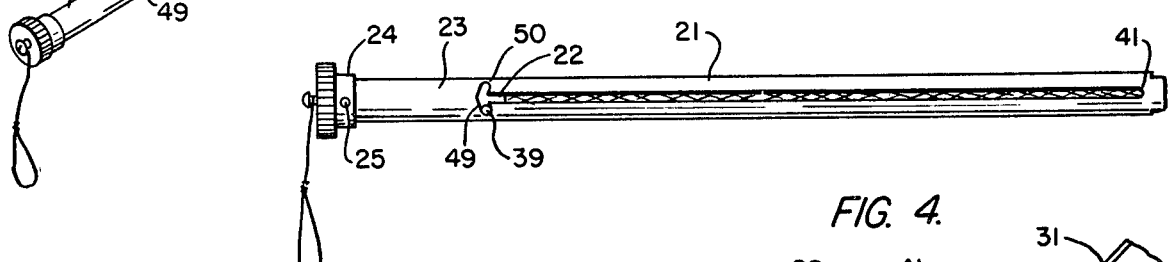
FIG. 2 is a top elevational view of a device embodying the invention showing the resilient net supporting frame member and net in retracted position internally of the tubular handle.

Referring more particularly to the drawings wherein like characters of reference designate like parts throughout the several views, the device embodying the invention comprises tubular handle 21 supporting a single one-piece resilient net supporting frame member 20, preferably molded of polypropylene into a curved open hoop shape, such as by injection molding. The resilient net supporting frame member 20 will resume its pre-formed curved shape see FIG. 1 when ejected from its compressed position, see FIG. 2 from within the tubular handle 21. Tubular handle 21, preferably molded of high impact styrene type of plastic, is provided with a longitudinal slot 22 formed in the sidewall thereof and extending from adjacent a rear handle grip end portion 23 to adjacent the forward end of tubular handle 21, noting FIGS. 1 and 2. When the landing net has been fully retracted after use into the hollow tubular handle 21, a control handle 39, suitably of wood, plastic or aluminum is secured into one of a pair of two available angular locking slots 49 and 50, thereby preventing the retracted landing net from sliding out of tubular handle 21; see FIG. 2 showing the control handle 39 secured in the angular locking slot 49. The rear end of tubular handle 21 has a cap or closure portion 24 secured thereto by pins or screws 25, or the like. The cap or closure portion 24 is provided with a screw, lug, or the like, to which a cord may be attached.

Figure 3:
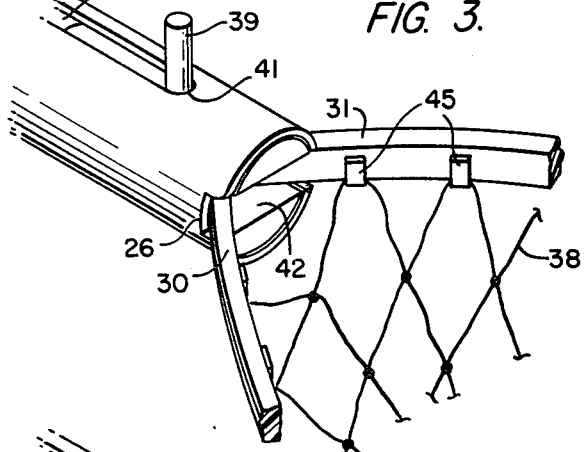
FIG. 3 is a partly broken-away perspective view of a first embodiment showing the front part of the tubular handle showing the resilient net supporting frame member in ejected position with its interior end resting against the notches in the tubular handle and supported by the notches of the internally located slide block.
Figure 6:
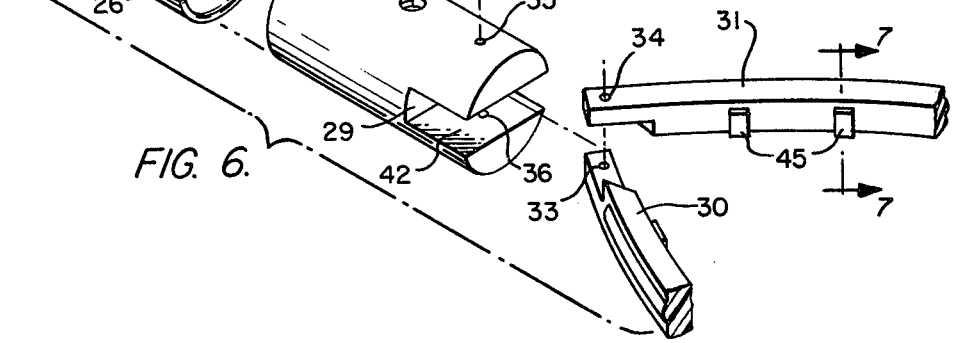
FIG. 6 is an exploded view of the FIG. 3 device showing the front end of the tubular handle with notches and the slide block with its notches and operating handle and internal hinge pivot pin as well as the interior ends of the resilient net supporting frame member.

In one embodiment, the forward end of tubular handle 21 is provided with notches 26 and 27, shown best in FIG. 6, against which the interior ends 30 and 31 of resilient net supporting frame member 20 rest when the resilient net supporting frame member is in a fully open and ejected position, as shown in FIG. 3.

Figure 4:
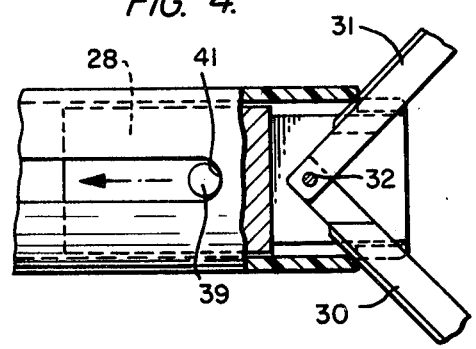
FIG. 4 is a fragmentary sectional plan view of the device of FIG. 3 showing the internal hinge connecting the internally located slide block with the interior ends of the resilient net supporting frame member in an ejected and fully open position.
Figure 5:
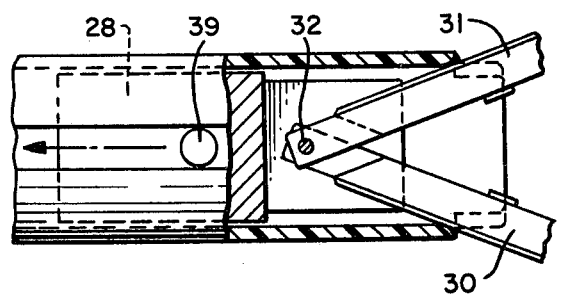
FIG. 5 is a fragmentary sectional plan view of the device of FIG. 3 showing the internally located slide block and the resilient net supporting frame member in the first phase of the retracting movement of the landing net.

Internally of the tubular handle 21, there is loosely supported a slide block 28, preferably of plastic, as shown in FIGS. 4, 5, and 6, which has a slot 29, at its forward end as shown in FIG. 6, in which in one embodiment are pivotally supported the interior ends 30 and 31 of the resilient net supporting frame member 20 by means of a suitable pivot pin 32, as shown in FIGS. 4 and 5. The pivot pin 32 passes through a pair of pivot openings 33 and 34 of the interior ends 30 and 31 of the resilient net supporting frame member 20, see FIG. 6, and is locked in position in openings 35 and 36 of the slide block 28, see FIG. 6.

The portion of the hoop farthest from the tubular handle 21 is formed of two "end" portions 47 and 48 preferably connected by the sole means of an integral and flexible hinge 37 unitary with such "end" portions 47 and 48, see FIG. 8, which allows the exterior end of the resilient net supporting frame member 20 to expand into its normal position when the landing net is ejected from the tubular handle 21, and also allows the exterior end of the resilient net supporting frame member 20 to be compressed together as the landing net is drawn inwardly into tubular handle 21.

The resilient net supporting frame member 20 and net 38 are ejected manually from tubular handle 21 by means of control handle 39, see FIGS. 3, 4, 5, 6, 9, 10 and 11, which is attached to slide block 28 when inserted into opening 40, see FIG. 6. When control handle 39 is moved manually forward along longitudinal slot 22, it is stopped when reaching the forward end of longitudinal slot 22 at position 41, see FIG. 3. When this operation takes place, the resilient net supporting frame member has been ejected fully and has by its sole resilient and pre-formed shape expanded to its fullest open landing net position, see FIG. 1. The interior ends 30 and 31 of the resilient net supporting frame member are pressing against notches 26 and 27 of tubular handle 20, thereby preventing the resilient net supporting frame member 20, from moving sideways. Also as both interior ends 30 and 31 are resting on portion 42 of slide block 28, as shown in FIG. 3, the resilient net supporting frame member 20 is prevented from moving downward.

As a modification, the forward end of tubular handle 21 may be constructed smoothly and without notches, see 43 in FIGS. 9 and 11.

As another modification slide block 28 may be constructed longer and with a deeper slot, see 28A and 29A in FIG. 11. When the landing net is in its fullest ejected position, slide block 28A will protrude outside of the forward end of tubular handle 21. When this operation takes place, the interior ends 30 and 31 of resilient net supporting frame member 20 are pressing against smooth forward end 43 of tubular handle 21, thereby preventing the resilient net supporting frame member 20 from moving sideways, see FIG. 9. Also as both interior ends 30 and 31 are resting on portion 42A of slide block 28A, as shown in FIG. 9, the resilient net supporting frame member 20 is prevented from moving downward.

As another modification, the interior ends 30 and 31 may be joined together by the sole means of an integral and unitary flexible hinge 44, see FIGS. 10 and 11, which allows the interior ends 30 and 31 to expand into their normally fully open position when the landing net is ejected from tubular handle 21, and also allows the interior ends 30 and 31 to be compressed together as the landing net is drawn inwardly into tubular handle 21. The retaining pin 32A is locked in position when inserted through opening 35A and 36A of slide block 28A, see FIG. 11.

The inner face surface of the resilient net supporting frame member 20 contains a series of integral and unitary hooks 45, see FIGS. 3, 6, 7, 8, 9, and 11, to which the net 38 is attached, thereby preventing wear of the net material as well as preventing any frictional resistance against the forward end of tubular handle 21 when the landing net is ejected for operational use or retracted after use. Also to reduce wear on the net, which desirably may be formed of nylon or polyester, it is desirable that the forward edges of the tubular handle 21 be smooth and rounded. The outer face surface of the resilient net supporting frame member 20 is desirably provided with a smooth uninterrupted rib 46, see FIG. 7 in order to reduce friction and resistance even more against the forward end of tubular handle 21 when the landing net is ejected for operational use or retracted after use.

From the foregoing description, it will be seen that simple, efficient and economical means have been provided for accomplishing all of the objects and advantages of the invention. It will be understood that the invention is not limited to the illustrated embodiment.

A particular advantage of the invention over all known prior devices of this type involve the easy retractability of the net without becoming tangled or damaged.

In the prior devices the hoop is invariably threaded through the net which causes tangling and wear during the ejection and retraction operations.

The provision of the net-supporting hooks along the interior surface of the hoop of the present device solves this serious problem which exists in the prior devices.

What is claimed is:

1. A telescopable, retractable landing net for fish comprising a handle having a hollow interior and an open forward end, and a slot extending along a substantial portion of the length thereof;
   a slide block of external size and shape approximately the same but slightly smaller than the internal size and shape of said hollow handle, said slide block being slidable within said hollow handle, and a control handle projecting from said slide block and through said slot to the exterior of said hollow handle;
   a resilient net supporting hoop formed of flexible material and connected to the forward end of said slide block by hinge means for collapsing said hoop so that said hoop will slide within the hollow of said hollow handle, said hoop having a hinge spaced approximately 180° from said hinge means, said hoop further having a generally smooth outer surface and generally smooth upper and lower edges,
   net-supporting hook means solely along the interior periphery of said hoop, said net-supporting hook means comprising a series of integral, net-retaining resilient hooks each of which extends upwardly from a point at or above said lower edge generally parallel to the interior peripheral surface of the hoop and terminating below the upper edge of said hoop, said series of hooks being spaced substantially entirely about said interior periphery of said hoop, and
   a net removably attached by said resilient net-supporting hooks to said hoop by having loops of said net hooked directly over said series of hooks;
   whereby upon grasping said control handle and sliding said slide block to the forward end of said hollow handle, said hoop and net are placed in fully open operating position, and upon sliding said slide block from said forward end of said hollow handle backwardly, said hoop becomes compressed and, along with said net, retracted within the hollow of said hollow handle.

2. A landing net according to claim 1 wherein the rearward end of said slot comprises control handle locking means provided with angular directed locking slots.

3. A landing net according to claim 1 wherein said slide block is provided with a horizontal slot along its forward end, with said hinge means being recessed within said horizontal slot.

4. A landing net according to claim 1 wherein said forward end of said hollow handle is provided with a horizontal slot.

5. A landing net according to claim 1 wherein said hoop is molded of polypropylene.

6. A landing net according to claim 5 wherein said hoop is injection molded into a resilient open-hoop shape.

7. A landing net according to claim 5 wherein said hinge means comprises two ends of said hoop joined together by a pin.

8. A landing net according to claim 6 wherein said hinge means comprises an integral and unitary hinge molded in said hoop.

9. A landing net according to claim 6 wherein said hinge spaced approximately 180° from said hinge means comprises an integral and unitary hinge molded in said hoop.

10. A landing net according to claim 6, wherein said series of hooks are integrally molded on said hoop along the inner surface thereof in a generally U-shape.

11. A landing net according to claim 5 wherein said hoop comprises a ridge centrally located and molded along its exterior periphery.

12. A telescopable, retractable landing net for landing fish, comprising
   a handle having a hollow interior and an open forward end, a resilient net supporting hoop having a smooth outer surface and substantially smooth upper and lower edges, said hoop being adapted to be retracted into the hollow interior of said handle and adapted to be extended out from the interior of said handle, and mounting means for mounting said resilient net supporting hoop and for sliding within the hollow interior of said handle and including means to retract said resilient net supporting hoop within the hollow interior of said handle and for extending said resilient net supporting hoop to the outside of said handle;
   said resilient net supporting hoop comprising a flexible material whereby said hoop flattens when retracted into said handle, and expands to its open-hoop shape when extended from said handle, said hoop being connected to the forward end of said mounting means so that said hoop will slide within the hollow interior of said hollow handle upon retraction of said mounting means, said hoop having a hinge spaced approximately 180° from said mounting means;

said hoop further having solely along its interior periphery a series of integral, net-retaining resilient hooks extending upwardly from at or above said lower edge substantially parallel to the interior hoop surface and terminating below the upper edge of said hoop, said series of hooks being spaced substantially entirely about said interior periphery of said hoop, whereby said hoop can be retracted into and extended from said hollow handle without interference between said hooks and the interior of said handle; and a net removably attached by said resilient net-supporting hooks to said hoop by having loops of said net hooked directly over said series of hooks.

13. A landing net according to claim 12, wherein said series of hooks is unitary with said hoop, being integrally molded therewith.

14. A landing net according to claim 13, wherein said hoop comprises polypropylene, and wherein said hinge comprises an integral and unitary hinge molded in said hoop.

* * * * *